United States Patent [19]
Leidinger

[11] Patent Number: 5,289,871
[45] Date of Patent: Mar. 1, 1994

[54] EVAPORATION HEAT EXCHANGER, ESPECIALLY FOR A SPACECRAFT

[75] Inventor: Bernhard Leidinger, Weyhe-Leeste, Fed. Rep. of Germany

[73] Assignee: Erno Raumfahrttechnik GmbH, Bremen, Fed. Rep. of Germany

[21] Appl. No.: 970,803

[22] Filed: Nov. 3, 1992

[30] Foreign Application Priority Data

Nov. 11, 1991 [DE] Fed. Rep. of Germany ....... 4136969

[51] Int. Cl.$^5$ ............................ B64G 1/50; F28B 1/02
[52] U.S. Cl. ...................................... 165/110; 165/41; 165/903; 122/40; 122/366
[58] Field of Search .................. 165/41, 110, 903; 122/366, 40, 39

[56] References Cited

U.S. PATENT DOCUMENTS

| | | | |
|---|---|---|---|
| 5,101,884 | 4/1992 | Leidinger | 165/41 |
| 5,137,082 | 8/1992 | Shimoya | 165/110 |

FOREIGN PATENT DOCUMENTS

3718873 11/1988 Fed. Rep. of Germany ........ 165/41

*Primary Examiner*—Albert W. Davis, Jr.
*Attorney, Agent, or Firm*—W. G. Fasse

[57] ABSTRACT

An evaporation heat exchanger having at least one active circulating circuit for a coolant liquid to be cooled, is constructed for removing heat in a spacecraft under a gravity-free operating condition and under different acceleration conditions. For this purpose, a housing encloses an evaporating space provided with at least one inlet valve for controlling the admission of a medium to be evaporated. The produced vapor or steam is discharged through a respective outlet port. A plurality of cooling tubes interconnected in a meandering shape form a number of tube panels in which the individual tubes are arranged with a different spacing from one another in a direction from the inlet valve to the outlet port. Preferably, these spacings increase in the flow direction from the inlet port to the outlet port to establish a constant flow speed for the evaporating medium. The tubes forming a panel may be arranged in a zig-zag pattern within the panel.

13 Claims, 3 Drawing Sheets

EVAPORATION HEAT EXCHANGER, ESPECIALLY FOR A SPACECRAFT

FIELD OF THE INVENTION

The invention relates to an evaporation heat exchanger, especially for cooling the cooling liquid in circulating circuits in spacecraft under gravity free conditions and under different acceleration conditions.

BACKGROUND INFORMATION

Ascending or descending spacecraft passing through the earth's atmosphere, or spacecraft orbiting in an orbit around the earth, are exposed to extreme thermal stress conditions. Therefore, it is necessary to provide a safe and reliable heat discharge.

German Patent Publication (DE-PS) 3,718,873 describes an evaporating heat exchanger suitable for the above stated purpose of cooling a spacecraft. In the known heat exchanger the medium to be cooled circulates in an active liquid circulating circuit for heat exchanges. For this purpose, the medium to be cooled is brought into a heat transfer contact with a medium to be evaporated. The medium to be evaporated is carried in a supply container in the spacecraft. The generated vapor is blown off from the spacecraft into its environment.

It is desirable to evaporate the cooling medium as much as possible to use it with an optimal efficiency. For this purpose it is further desirable to achieve a sufficiently high heat transfer between the cooling medium to be evaporated and the flow channels which carry the liquid to be cooled. To perform these two functions efficiently, it is necessary that the generated vapor is separated from the medium portion which is still liquid to make sure that liquid portions of the evaporating medium are not discharged from the spacecraft in the form of large liquid drops which have not participated in the evaporation, and thus in the cooling process.

In the above mentioned German Patent Publication (DE-PS) 3,718,873 it is the aim to deposit non-evaporated liquid remainders with the aid of mass inertia forces on the walls of the cooling liquid channels. For this purpose, the cooling liquid channels are arranged in a folded pattern as viewed in the flow direction. The so deposited liquid remainders are then transferred into the gas phase on the surface of these channels. However, tests performed with the known heat exchanger have shown that the utilization of the cooling medium to be evaporated is not at all optimal and hence not efficient for the intended purpose.

U.S. Pat. No. 5,101,884 (Leidinger), issued Apr. 7, 1992, describes an evaporation heat exchanger having at least one active circulating circuit for a coolant liquid to be cooled, and is constructed for removing heat in a spacecraft under a gravity-free operating condition and under different acceleration conditions. For this purpose, a housing encloses an evaporating space provided with at least one inlet valve for controlling the admission of a medium to be evaporated. The produced vapor or steam is discharged through a respective port. A plurality of cooling tubes interconnected in a meandering shape form a number of tube panels in which the individual tubes are arranged in a zig-zagging pattern to form respective flow passages for the medium to be evaporated. The individual tubes extend in parallel to each other and perpendicularly to the flow direction of the medium to be evaporated, while the meandering configuration is forming the zig-zag pattern. This arrangement of the cooling tubes assures a high efficiency in the heat transfer and also in the complete conversion of the liquid to be evaporated into vapor or steam. Due to the zig-zag pattern, the medium to be evaporated, or droplets thereof, are repeatedly intercepted and deposited by the exchanger surfaces of the tubes so that the exchanger functions as a drip-catcher evaporator. This earlier evaporation heat exchanger still leaves room for improvement.

OBJECTS OF THE INVENTION

In view of the foregoing it is the aim of the invention to achieve the following objects singly or in combination:

to construct an evaporating heat exchanger of the type described above in such a way that the medium to be evaporated is practically completely transferred into the vapor phase to assure its efficient utilization for an optimal heat exchange;

to make sure that the medium to be evaporated is practically completely converted into the vapor phase and that only vapor is discharged from the spacecraft and that larger liquid drops are retained for a highly efficient use of the evaporating medium.

to arrange flow channel forming tubes carrying the medium to be cooled in such a way that an optimal utilization of the available space is assured;

to shape and arrange the cooling liquid carrying tubes in such a way as to optimally increase the heat exchanging contact between these tubes and the medium to be evaporated; and to provide an evaporation heat exchanger which is especially suitable for cooling spacecraft passing through the earth's atmosphere or which are exposed to extreme thermal loads in their orbits, whereby a safe and reliable heat discharge must be assured.

SUMMARY OF THE INVENTION

The heat exchanger according to the invention is characterized in that the cooling liquid channels leading from an inlet valve in an evaporator housing to a vapor outlet in the housing, whereby a flow direction for the evaporant is established from the inlet valve to the vapor outlet, comprise bundles of tubes extending perpendicularly to the main flow direction of the medium to be evaporated and parallel to one another, whereby pairs of these tubes which follow one another in the main flow direction, are located in alternatingly displaced positions relative to one another and relative to a plane extending in the main flow direction. Spacings are provided between neighboring tubes in the flow direction of the evaporant and these spacings differ from one another in the flow direction. These tube bundles form tube panels which zig-zag relative to said main flow direction. Preferably, the smallest spacing between neighboring tubes is provided near the inlet valve and these spacings increase in the flow direction toward the vapor outlet.

The varying spacing between neighboring parallel tubes as taught by the invention has the advantage that a constant flow speed or velocity is established for the evaporating medium or evaporant in spite of the fact that the volume of the evaporant increases in the flow direction as the evaporation progresses. Such a constant flow speed is desirable because it helps establishing especially favorable heat transfer conditions. Incidentally, the cooling medium is preferably water and/or ammonia.

In a preferred embodiment the spacings between several neighboring tube pairs are equal to each other near the inlet valve. Further downstream of the inlet area the spacings increase continuously. This feature takes into account that a constant flow speed of the cooling medium can establish itself only at some distance al downstream of the inlet valves. This distance can be calculated from the following relationship:

$$a1 = C_0 + C_1 \times \frac{X}{L}, \text{ wherein}$$

$C_0$ and $C_1$ are constants and is the relative spacing from the heat exchanger's inlet to its outlet. For example $C_0 = 2*D$ and $C_1 = 3*D$, where D is the outer diameter of the tube.

These features have the advantage of a high heat exchange efficiency, and due to the high packing density in the tube bundles, a relatively compact volume for the heat exchanger. Further, the structure is simple and hence easy to manufacture, maintain and to test.

The special arrangement and configuration of the individual cooling tubes serves for a further optimizing of the heat transfer characteristics, while simultaneously assuring a low pressure loss of the cooling circulating circuit as well as of the medium to be evaporated on its way from the inlet valve to the exit or discharge opening. These features minimize the required pumping power and the evaporating temperature can be rather low at the prevailing low pressure.

The present evaporating heat exchanger functions in the manner of a drop separator due to the arrangement of the liquid channels in the form of tube bundles extending in a direction across or perpendicularly to the main flow direction and because the tubes in each individual plane are arranged in alternatingly displaced positions relative to one another. Several tube groups form several tube panels in a plurality of planes. These features make sure that the entire surface area available for causing the evaporation is used as completely as possible so that these liquid channel surfaces achieve a practically complete evaporation of the entire medium fed into the evaporator.

The surface of the cooling tubes should preferably be rough to have a capillary type of action, whereby the forces tending to hold the evaporant to the cooling tubes are enhanced and a good wetting action by the evaporant on the cooling tube surfaces is achieved.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

In the Figures, the same components are provided with the same reference numbers.

Figure 1:
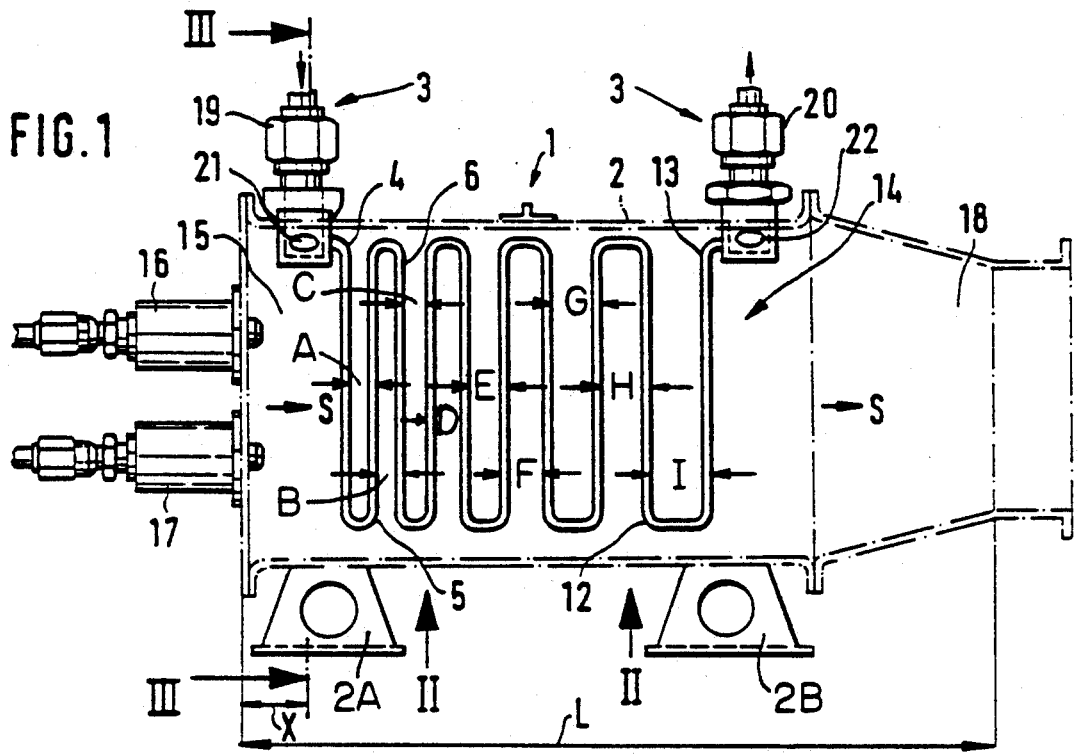
FIG. 1 is a side view into an open side of the present heat exchanger.

FIG. 1 shows a schematic longitudinal section through a heat exchanger 1 comprising a housing 2 merely shown by dash-dotted lines to reveal the internal arrangement of the cooling tubes 4 to 13 forming an active coolant circulating circuit 3 containing, for example water or a cooling liquid like refrigerant R114 known under the Tradenames "Freon" or "Frigen 114" flowing in a coolant circulating circuit of a spacecraft. The liquid to be cooled when it passes through the tubes 4 to 13 may also, for example, be the hydraulic oil of the hydraulic system of a spacecraft. The individual tubes 4 to 13 form a bundle or panel 14 to be described in more detail below.

The housing 2 with its cover 2C encloses an inlet space 15 communicating through inlet valves 16 and 17 with a supply of a cooling medium to be evaporated for cooling the coolant passing through the tube bundle or panel 14. The supply container for the cooling medium to be evaporated is not shown. However, the evaporating liquid may be water and/or ammonia or the like. The opposite end of the housing 2 is formed as a vapor discharge port 18. The flow direction of the cooling medium is indicated by the arrow S.

According to the invention there are spacings A, B, C, D, E, F, G, . . . between neighboring parallel tube legs 4, 5, 6, . . . and these spacings differ from one another in the flow direction S. Preferably, these spacings A, B, . . . increase in the flow direction S to establish a constant flow speed or velocity for the evaporant as close as possible to the inflow of the evaporant. However, the first two or three spacings A, B, and C are preferably of equal size. Spacings D, E, F, . . . between neighboring long tube legs then increase toward the vapor exit 18 by a constant factor.

The active cooling circuit 3 has an inlet port 19 and an outlet port 20 interconnected through a plurality of tube bundles or panels 14. These bundles or panels 14 are arranged relative to the flow direction S as will be explained in more detail below with reference to FIG. 2. Preferably, the flow direction S is perpendicularly to the tubes 4 to 13.

Figure 2:
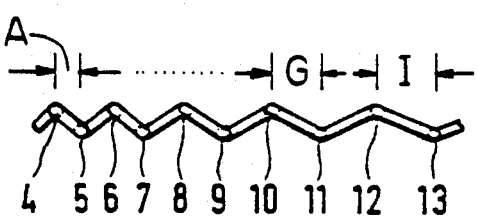
FIG. 2 is a view in the direction of the arrows II in FIG. 1, showing one panel of cooling tubes arranged according to the invention in a meandering zig-zag pattern.
Figure 3:
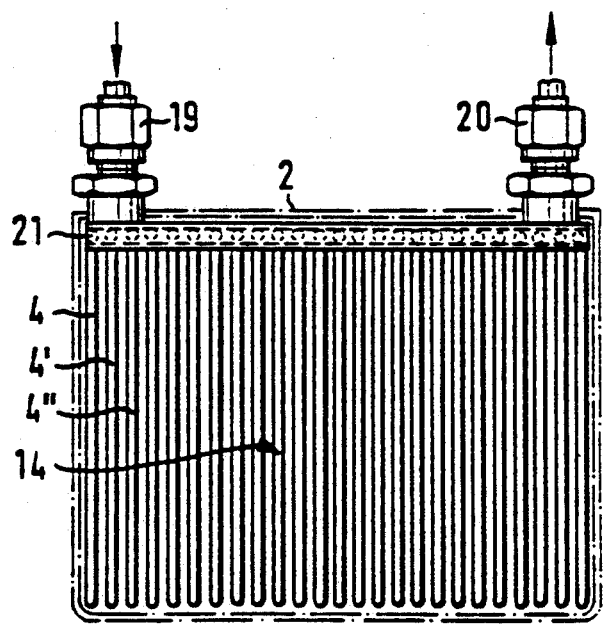
FIG. 3 is a view approximately in the direction toward the plane indicated by the arrows III in FIG. 1.

As shown in FIG. 2, the bundle or panel 14 of tubes 4 to 13 have long leg straight tube sections and short leg curved tube sections interconnecting the long tube legs. The short tube legs are, for example, semi-circular tube sections to form the meandering pattern shown in FIG. 1. Additionally, according to the invention, each short tube leg is angularly displaced relative to the next tube as shown in FIG. 2. The short legs of the tubes 4 to 13 in each panel 14 zig-zag through the housing 2 and neighboring panels 14 form zig-zagging flow paths between neighboring panels, whereby the zig-zagging increases the flow path length for the medium to be evaporated. The number of panels may be as desired. The individual inlet tubes 4, 4', 4", shown in FIG. 3, are interconnected at the inlet end to a manifold pipe 21. At the outlet end the tubes 13 are connected to a manifold pipe 22. The manifold 21 is connected to the inlet port 19 while the manifold 22 is connected to the outlet port 20. The medium to be cooled flows into the inlet port 19 and out of the outlet port 20, which form part of the closed circulating circuit 3. As further shown in FIG. 1, the housing 2 is supported by mounting pads 2A and 2B.

Referring further to FIG. 2 the angle of the zig-zag should be in the range of about 15° to about 45°, whereby the folding angle between two neighboring pairs of tubes becomes about 150° or less. The resulting zig-zagging permits the nesting of the zig-zag of one panel within the zig-zag of the neighboring panels so that directly neighboring short zig-zag tube legs of all neighboring panels extend respectively in parallel to each other without any portion of any tube panel reaching into any free space of any other tube panel and with the required spacing between neighboring tube panels 14, to form the zig-zagging flow paths.

The view of FIG. 3 shows that, for example, twenty-three panels 14 are arranged in parallel to each other in the housing 2. As seen in FIG. 1, each panel 14 comprises ten tubes 4 to 13 so that a total of two-hundred and thirty tubes are easily accommodated in a relatively small volume. Yet, due to the zig-zagging arrangement, the present evaporator is capable of operating as a so-called TRAP, i.e. droplet trap evaporator. The operation efficiency as a trap evaporator is enhanced by the zig-zagging and nesting arrangement of the tubes and tube panels respectively.

Figure 4:
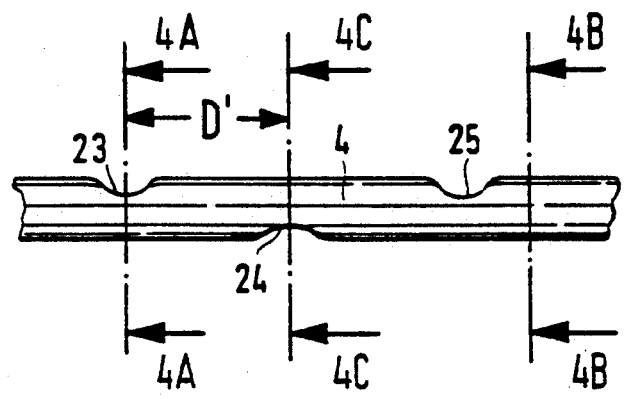
FIG. 4 is a side view of a section of an individual cooling tube.
Figure 4A:
FIG. 4a is a sectional view along section plane A—A in FIG. 4.
Figure 4B:
FIG. 4b is a sectional view along section plane B—B in FIG. 4.

Referring to FIG. 4, the individual tubes 4 to 13 are provided with indentations 23, 24, and 25. FIG. 4a shows the indentation 23 at the sectional plane A—A. FIG. 4b shows the oval, somewhat flattened cross-section of the tubes along section plane B—B.

Figure 4C:
FIG. 4c is a sectional view along section plane C—C in FIG. 4.
Figure 5:
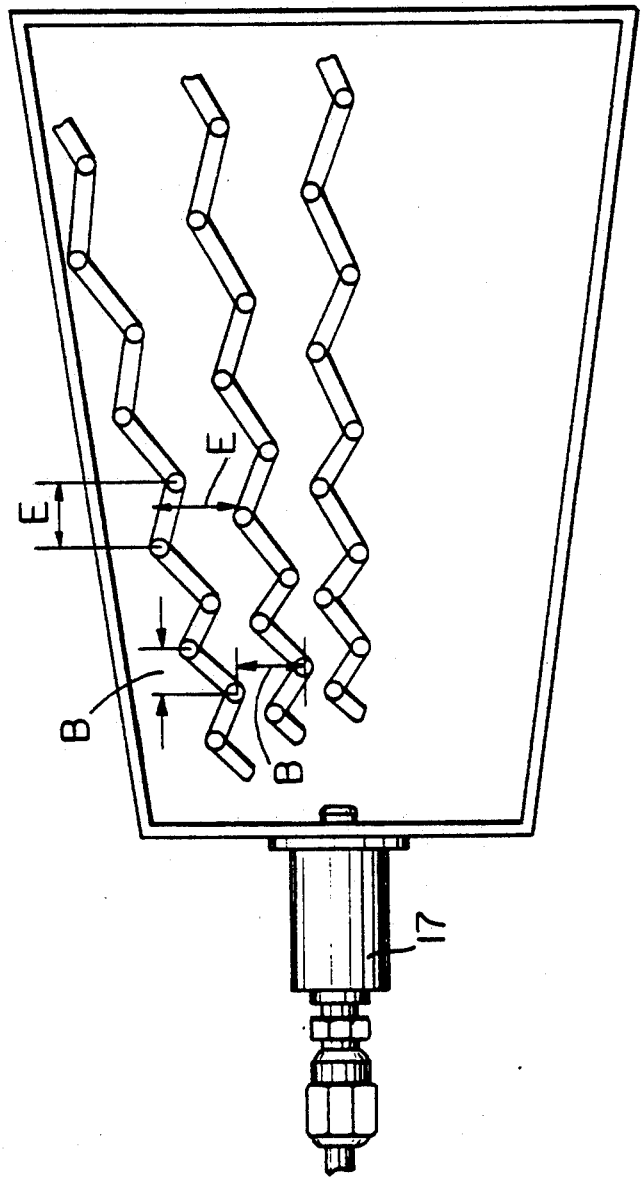
FIG. 5 is a sketch of view in the direction of the arrows II in FIG. 1, showing the increasing distances between the heat exchanger tubes.

FIG. 4c shows the indentation 24 along section lines C—C in FIG. 4. The on-center spacings D' between neighboring indentations 23, 24, are preferably equal along the length of each tube so that the indentations 23, 25 on one side of the tube are staggered or phase shifted relative to the indentations 24 on the opposite side of the tube. Additionally, neighboring indentations are arranged on opposite sides of the tube as is apparent from FIG. 4. Prior to making the indentations 23, 24, 25, the flat or short diameter of the tubes as shown in FIG. 4b is, for example, 2.51 mm. The indentations are then formed into the relatively flat sides of the tubes. The indentations cause eddy currents which in turn contribute to a good heat transfer characteristic. The spacing D' between neighboring indentations is, for example, 4.25 mm. Each tube 4 to 13, outside the semi-circular interconnecting short leg tube sections, has, for example, a length of 95 mm. As mentioned, with ten tubes in each of twenty-three tube panels, a total of two-hundred and thirty tubes is easily accommodated in a relatively small volume which is advantageous for achieving a highly efficient heat transfer and hence cooling. The number of panels will in practice depend on the particular cooling requirements.

The inlet valves 16 and 17 permit controlling the volume flow of the medium to be evaporated, for example, water. These valves 16 and 17 may in turn be controllable by an electromagnet energized in a pulsating manner for opening these valves for short time durations as required under particular operating conditions.

The medium to be evaporated is introduced into the space 15 in the housing 2 under a supply pressure which is above the boiling pressure in the evaporation space 15. Due to the low pressure prevailing in the space 15, a small proportion of the medium to be evaporated does evaporate already in the space 15 in an adiabatic manner at a temperature of about 60° C., whereby the liquid of the medium to be evaporated is cooled down (so-called flash evaporation). Where water is the medium to be evaporated, about 5 to 8% of the water mass is cooled in this adiabatic manner. This initial evaporation in the space 15 produces gas which flows to the exhaust and drags the remaining liquid droplets, thereby generating an accelerated two-phase flow by the gas expansion. If the cooling medium is water having a temperature of 25° C., the two-phase flow comprises about 99.95% water vapor by volume and about 0.05% by volume of liquid water if the pressure in the evaporating space 15 is within the range of about 5 to 10 mbar.

The accelerated two-phase flow now contacts the tubes 4 to 13 forming the tube bundles or panels 14 of the cooling circulating circuit 3. Incidentally, several circuits 3 can be formed to provide a plurality of separate flow circuits for separate cooling liquids to be cooled. The panels 14 may be arranged in groups, whereby each group of panels is connected to a separate or different cooling circuit. The cooling liquid to be cooled in the circuit or circuit 3 transports in a known manner heat from heat producers to the cooling channels formed by the panels 14 providing the actual heat exchanger surfaces at which the heat is taken up by the medium to be evaporated so that the latter is actually evaporated and the resulting vapor or steam exits through the discharge outlet 18 of a spacecraft or the like.

In operation, as the liquid droplets still present in the gas phase are entrained to travel along with the gas phase, these droplets tend to deviate from the main gas flow direction S due to the fact that the droplets have a larger mass inertia than the gas phase, whereby the droplets impinge on the outer tube surfaces of the cooling channels formed by two neighboring panels 14. On these surfaces the liquid droplets form a liquid film which partially evaporates. Due to the staggering caused by the zig-zagging shape of the panels 14, the arrangement functions in the manner of a heated droplet trap evaporator, whereby the tubes 4 to 13 of the panels functions as deflector surfaces. At the folding points, namely where the tubes are located, the portions of the liquid film not yet evaporated, form new droplets which are entrained by the two-phase flow and are again caused to impinge on the outer surfaces of the cooling liquid channels. Thus, the two-phase flow is repeatedly divided, whereby, according to the invention, the zig-zagging flow direction causes an especially intensive contacting of the medium to be evaporated with the surfaces to be cooled. As a result, the apparatus according to the invention achieves a complete evaporation with an excellent efficiency in the heat transfer.

Since, according to the invention the spacings A, B, C, ... between neighboring tubes 4, 5, 6, ... in a panel differ in the flow direction S, more specifically, since the spacings increase from the inlet valves 16, 17 toward the vapor outlet 18, a substantially constant flow speed establishes itself for the volume flow of the evaporant after a short time duration following entry into the space 15. In other words, the constant flow speed begins relatively close to and downstream of the inlet valves 16, 17 for the evaporant. Such constant flow speed greatly contributes to the excellent efficiency in the heat transfer in an evaporator of the invention.

Although the invention has been described with reference to specific example embodiments, it will be appreciated that it is intended to cover all modifications and equivalents within the scope of the appended claims.

What I claim is:

1. A heat exchanger for cooling a coolant in a cooling circuit in a spacecraft under gravity-free operating conditions and under different acceleration conditions, comprising a housing enclosing an evaporation space, a plurality of tube panels in said evaporation space, inlet valve means for introducing an evaporating medium into said evaporation space, vapor outlet means for discharging vapor from said housing, a plurality of cooling tubes forming said tube panels in said housing, short tube legs interconnecting said cooling tubes to form meandering tube loops forming part of said cooling circuit, said cooling tubes having long legs extending in parallel to one another and substantially perpendicularly to a main flow direction of said evaporating medium from said inlet valve means to said vapor outlet means, and wherein spacings (A, B, C, ...) between neighboring long tube legs differ from one another in said flow direction from said inlet valve means to said vapor outlet means for establishing a substantially constant flow speed of said evaporating medium, whereby contact between tubes is effectively increased while still permitting a substantially free flow of said evaporating medium through flow paths between neighboring tube panels for an efficient evaporation.

2. The heat exchanger of claim 1, wherein said spacings increase from said inlet valve means to said vapor outlet means.

3. The heat exchanger of claim 1, wherein several of said spacings (A, B, C) next to said inlet valve means are the same.

4. The heat exchanger of claim 1, wherein said short tube legs of said cooling tubes are so arranged that two neighboring tubes in a bundle of tubes forming a tube panel of said plurality of tube panels, are alternatingly displaced laterally relative to a plane extending in said main flow direction, to form each tube panel with a zig-zag pattern, and wherein all tube panels are arranged so that zig-zagging flow paths for said evaporating medium are formed between neighboring tube panels.

5. The heat exchanger of claim 1, wherein said neighboring tube panels are displaced relative to each other in said flow direction in such a way that long tube legs in one panel register with a spacing between neighboring long tube legs in a neighboring tube panel and vice versa.

6. The heat exchanger of claim 1, wherein said tubes have a flattened cross-section.

7. The heat exchanger of claim 6, wherein each flattened tube has additional indentations for an improved heat transfer.

8. The heat exchanger of claim 7, wherein said indentations are located alternately on opposite sides of the respective tube, and wherein said indentations are uniformly spaced from one another along opposite sides of said tubes.

9. The heat exchanger of claim 1, wherein said tubes have a rough, capillary surface, achieved by surface treatment with sandpaper or equivalent mechanical tool, for increasing a surface contact between said tubes and said evaporating medium.

10. The heat exchanger of claim 1, wherein at least certain of said cooling tubes contact walls of said housing for avoiding freeze-up.

11. The heat exchanger of claim 1, wherein said evaporating medium is water.

12. The heat exchanger of claim 1, wherein said evaporating medium is ammonia.

13. The heat exchanger of claim 1, wherein said evaporating medium is water and ammonia used sequentially.

* * * * *

UNITED STATES PATENT AND TRADEMARK OFFICE
CERTIFICATE OF CORRECTION

PATENT NO. : 5,289,871
DATED : March 1, 1994
INVENTOR(S) : Bernhard Leidinger It is certified that error appears in the above-identified patent and that said Letters Patent is hereby corrected as shown below:

Column 3, line 16, before "is" insert -- $\frac{X}{L}$ --.

Signed and Sealed this

Nineteenth Day of July, 1994

*Attest:*

BRUCE LEHMAN

*Attesting Officer*     *Commissioner of Patents and Trademarks*